G. B. MORRISON.
PIE CRUST FORMING AND TRIMMING DEVICE.
APPLICATION FILED FEB. 24, 1912.
1,063,890.
Patented June 3, 1913.
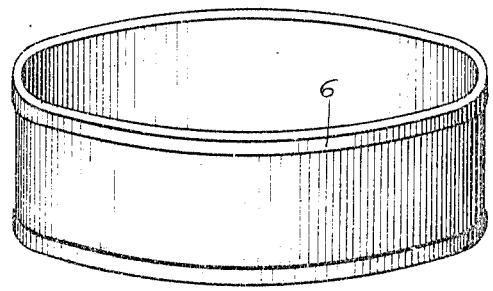
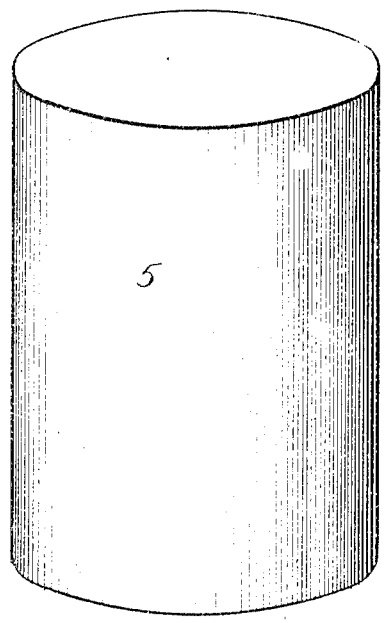
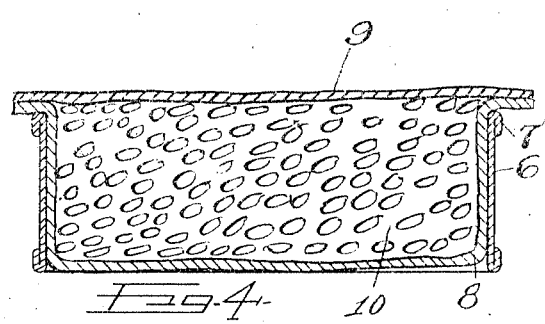
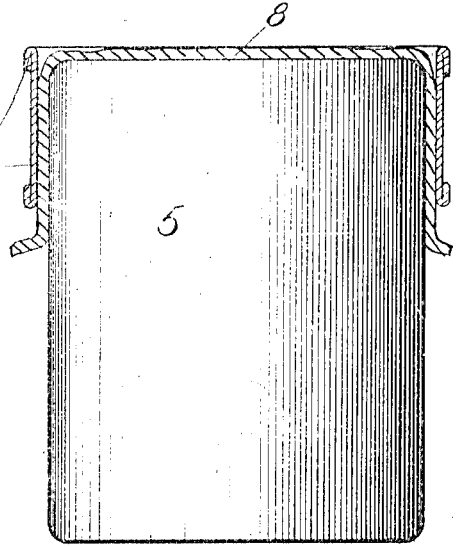
George Baker Morrison, Inventor
Witnesses

UNITED STATES PATENT OFFICE.

GEORGE BAKER MORRISON, OF SALT LAKE CITY, UTAH.

PIE-CRUST FORMING AND TRIMMING DEVICE.

1,063,890.  Specification of Letters Patent.  Patented June 3, 1913.

Application filed February 24, 1912. Serial No. 679,547.

*To all whom it may concern:*

Be it known that I, GEORGE BAKER MORRISON, a citizen of the United States of America, residing at Salt Lake City, in the county of Salt Lake and State of Utah, have invented certain new and useful Improvements in Pie-Crust Forming and Trimming Devices, of which the following is a specification.

This invention relates to a pie crust forming and trimming device and has for its object the provision of a simple and inexpensive device adapted to form the pie crust into a cup like shape, and after the filling has been deposited in the cup like crust, and a cover crust has been applied, to trim off the ragged and protruding edges of the crust.

Further objects and advantages of the invention will be set forth in the detailed description, which now follows.

In the accompanying drawing Figure 1 is a perspective view of a ring like member hereinafter described. Fig. 2 is a perspective view of a cylindrical former used in conjunction with the ring shown in Fig. 1. Fig. 3 is a view partly in side elevation and partly in section, illustrating the pie crust formed into cup shape by passing the ring down over the former, and Fig. 4 is a detailed sectional view through the ring and crust, illustrating the crust ready to be cut off, as hereinafter described.

Like numerals designate corresponding parts in all of the figures of the drawing.

Referring to the drawing, the numeral 5 designates a preferably cylindrical former block, and 6 designates an annular member preferably having its edges turned, as at 7.

The crust indicated at 8 is first laid over the end of the former 5, as indicated in Fig. 3, after which the ring is pressed down, forcing the dough or crust to the position illustrated in said figure. The crust and ring are then inverted, and the former removed, leaving these parts in the position shown, in Fig. 4. A cover crust 9 of dough, is placed over the top of the pie after the filling 10 has been placed in the cup like crust, and by rolling the cylindrical former block over the ring or angular member 6, it is apparent that the ragged and overhanging edges of the cover 9 and body 8 of the pie crust, will be crushed or cut off in a neat manner.

From the foregoing description it will be seen that the present invention comprises the two very simple elements 5 and 6, and that by means of these simple elements, the crust dough is first formed to cup like form and is then, by means of the element 6, cut off in a neat and symmetrical manner.

It is apparent that this device is adapted for use in any kind of pies, whether they be of the nature of confectionery or meat pies.

While the elements shown and described, are well adapted to serve the purposes for which they are intended, it is to be understood that the invention is not limited to the precise construction set forth, but includes within its purview, such changes as may be made within the scope of the appended claim.

Having described my invention, what I claim is:

In a device of the character described, the combination with a free cylindrical former, of a free ring-like member sufficiently larger in diameter than said former to permit a thickness of dough to lie between said former and said ring-like member to thereby form the dough into a cup-like form when the ring-like member is passed over said former, said ring-like member having one of its edges formed to cut off the crust dough when the former is rolled thereover, said former being of such length as to span said ring-like member to thereby adapt it to be rolled over said ring-like member, and to co-act with said ring-like member in cutting off the crust dough.

In testimony whereof I affix my signature in presence of two witnesses.

GEORGE BAKER MORRISON.

Witnesses:
E. C. ASHTON,
F. O. FRICK.